Feb. 4, 1947. A. L. PARKER ET AL 2,415,258
HYDRAULIC RELIEF VALVE
Filed Feb. 4, 1943
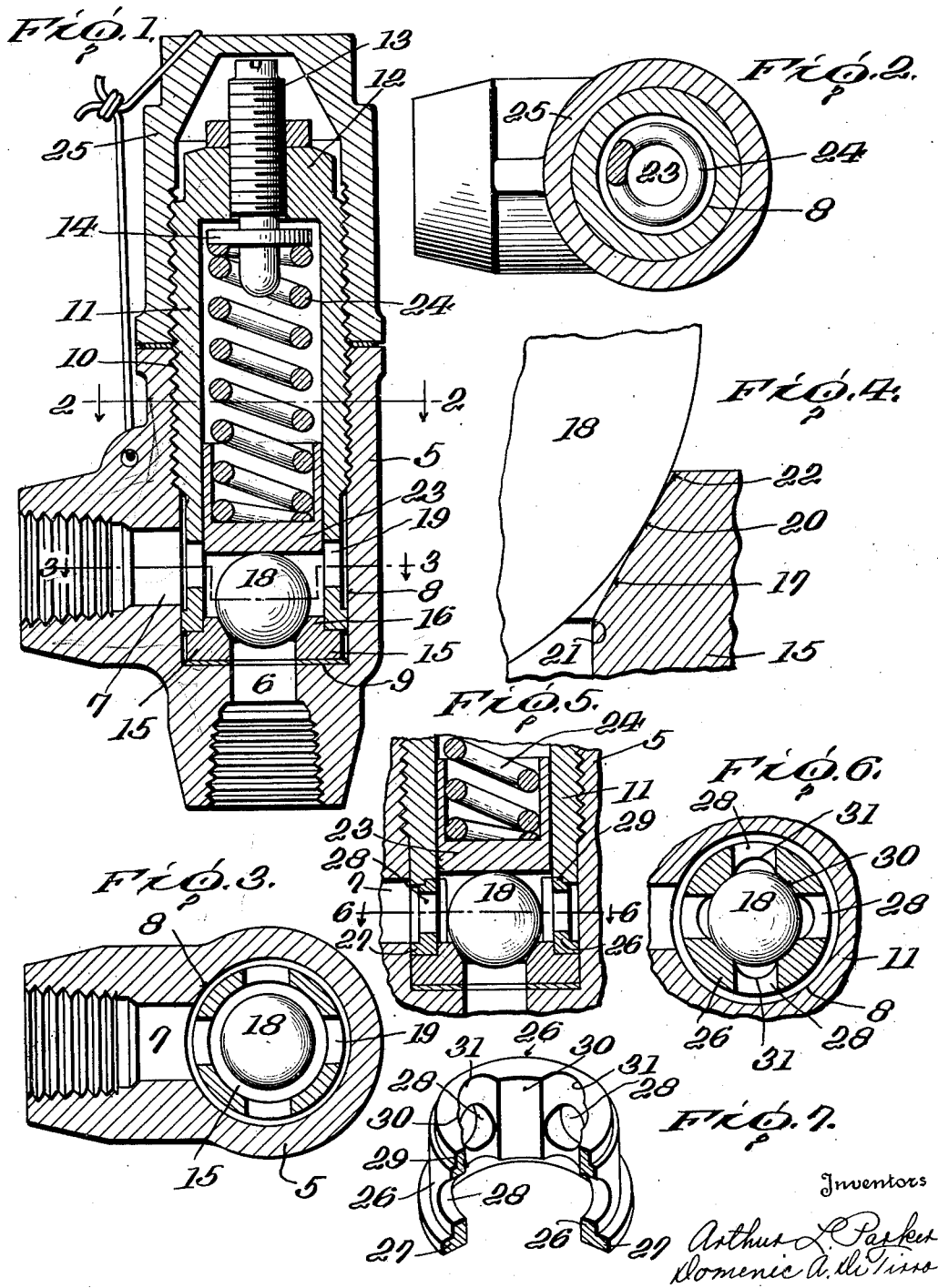

Patented Feb. 4, 1947

2,415,258

UNITED STATES PATENT OFFICE 2,415,258

HYDRAULIC RELIEF VALVE

Arthur L. Parker and Domenic A. Di Tirro, Cleveland, Ohio, assignors to The Parker Appliance Company, Cleveland, Ohio, a corporation of Ohio Application February 4, 1943, Serial No. 474,722

4 Claims. (Cl. 137—53)

The invention relates generally to valve structures and primarily seeks to provide certain new and useful improvements in hydraulic ball relief valve structures effective to prevent chattering and squealing and the damage to the ball and seat elements resulting from chattering.

It has been discovered that in valve structures of the character stated faulty seating of the valve ball and failure to properly guide and cushion movement of the ball from its seat has resulted in chattering of the ball against its seat, flow through the valve has been uneven and attended by a squealing noise, and ball and seat structures have been marked and damaged by chattering contact. Therefore, the present invention seeks to provide an improved valve structure of the character stated in which is included a novel seat structure in which provision is made for just the proper freedom for fluid to flow through the seat and about the ball without tendency to squeal and in which no sharp edge is presented for damaging contact with the ball, in which the ball is guided in perfect alignment with the seat in all positions, and in which movement of the ball from its seat is cushioned in a manner assuring against chattering.

An object of the invention is to provide in a valve of the character stated a ball seat structure comprising a seat ring having a seat surface flared at an angle of approximately 60° with respect to a base drawn prependicular to the axis of the flow passage through the ring, and of such major and minor diameters relative to the size of the ball which is to seat thereon that the ball will engage the seat surface at a point from two-thirds to three-fourths the distance from the minor diameter toward the major diameter.

Another object of the invention is to provide in a valve of the character stated a cylindriform bushing providing a chamber in which the valve ball operates, a ring seat for the valve having a centering boss received in the end of the bushing for perfectly centering the seat in the bushing, and a spring pressed cup of considerable length having free sliding fit in the bushing and opposing and cushioning movement of the ball valve element off said seat.

Another object of the invention is to provide a valve structure of the character stated in which the seat ring is indirectly centered in the bushing, said seat ring being centered in a ball guide sleeve having provision therein for accurately guiding the ball while off the seat, and said sleeve being in turn centered in the bushing endwise of the spring pressed ball cushioning cup therein.

With the above and other objects in view that will hereinafter appear, the nature of the invention will be more fully understood by following the detailed description, the appended claims and the several views illustrated in the accompanying drawing.

In the drawing:

Figure 1 is a central longitudinal sectional view of a valve structure embodying the invention.

Figure 2 is a cross section taken on the line 2—2 on Figure 1.

Figure 3 is a cross section on the line 3—3 on Figure 1.

Figure 4 is an enlarged fragmentary sectional view illustrating the point of contact of the ball valve element with the flared ring seat surface.

Figure 5 is a fragmentary central longitudinal sectional view illustrating a modified form of the invention in which is included a ball valve element guiding and seat ring centering sleeve.

Figure 6 is a cross section taken on the line 6—6 on Figure 5.

Figure 7 is a detail sectional perspective view illustrating the ball valve element guiding and seat ring centering sleeve.

In the relief valve structure herein illustrated as an example of embodiment of the invention there is included a casing 5 which is generally cylindriform in shape and includes a center bottom inlet port 6 and a laterally directed outlet port 7 which communicate through a counterbore 8 in the casing serving to provide a valve chamber. The counterbore 8 also serves to provide an abutment shoulder 9 surrounding the inlet port 6 in the manner clearly illustrated in Figure 1.

The counterbore 8 in the casing 5 is internally threaded as at 10 to threadably receive the externally threaded hollow cylindrical bushing 11 which is closed at its upper end as at 12 and provided with a spring adjuster screw 13 having an abutment head 14 disposed within the bushing. The open lower end of the bushing is closed by a seat ring 15 having a centering boss 16 extending upwardly into the bushing 11 for the purpose of holding the seat ring in perfect axial alignment with the bushing. The seat ring is provided with a flared seat 17 which is engaged by a ball valve element 18, said ball being designed to control passage of fluid under pressure from the inlet port 6 to the outlet port 7, suitable laterally directed ports 19 being provided in the lower end of the bushing above the seat ring for communicating between the interior of the bushing and said outlet port.

The particular angle of the seat flare 17 is very important. The seat surface engaged by the ball 18 is flared at an angle of approximately 60 degrees with respect to a base drawn perpendicular to the common axis of the seat ring 15 and the bushing 11 and of such major and minor diameters relative to the size of the ball that the ball will engage the seat surface at a point 20 from two-thirds to three-fourths the distance from the minor diameter 21 toward the major diameter 22 in the manner clearly illustrated in Figure 4 of the drawing. It has been discovered that when seat flares of much shallower angles are provided the ball is caused to seat against a sharp edge instead of a flat surface with the result that repeated valve action damages the surface of the ball, the seat or bore, and the fluid in its passage through the valve has its path abruptly bent in passing around the ball. This is disadvantageous since it increases the pressure drop through the valve and tends to cause chattering of the ball on its seat with resulting damage to the ball, the seat or bore in the manner stated. Attempts to avoid this sharp edge contact while retaining the shallow angle of the flare necessitate the reduction of the seat ring bore diameter to such an extent as to objectionably restrict flow through the valve. Attempts to remedy the objectionable conditions stated by forming the ball engaging seat flare at angles steeper than the preferred angle herein taught result in tendency of the ball to wedge in the seat, and in such structures the ball must be unseated to a great extent before sufficient flow passes through the valve.

A deep cushion cup 23 is provided in the bushing 11 above the ball valve element 18 and has a free sliding fit therein, a cushion spring 24 interposed between the cup and the abutment head 14 serving to yieldably hold the bottom of the cup against the ball 18 and the ball against the flared seat 17. A closure cap 25 is threadably mounted on the externally threaded portion of the bushing 11 extending above the upper end of the valve casing 5.

The clearance in the sliding fit of the cup 23 in the bushing 11 also is very important. This clearance varies inversely with the fluid pressure to be controlled; that is, a high pressure requires a closer fitting cushioning cup in order to provide the desired valve cushioning action, and a lower pressure requires a larger clearance in order to produce the desired results. It has been discovered that a clearance of .003 to .005 should be provided in a valve designed for opening pressures ranging from 1100 to 1850 pounds per square inch, and a clearance of .005 to .007 should be provided in a valve designed for opening pressures up to 1100 pounds per square inch.

In Figures 5 through 7 of the drawing there is illustrated a slightly modified form of valve structure in which the valve seat ring is indirectly centered in the bushing rather than by direct contact in the bushing in the manner illustrated in Figures 1 through 4. In this form of the invention there is provided a centering sleeve 26 which receives the seat ring centering boss at the bottom and is provided with a flange enlargement 27 at its lower end which engages in centering relation in the casing 5 in the manner clearly illustrated in Figure 5. The sleeve is provided with lateral porting 28 communicating with the outlet port, and at its upper end is provided with a centering boss extension 29 which is received in centering relation in the lower end of the bushing which in this structure terminates just short of the outlet port. The sleeve 26 also is provided with ball guide ribs 30 which serve to accurately guide movement of the ball along the common axis of the seat ring, the sleeve and the bushing, suitable clearances 31 also being provided to permit proper flow of fluid to the ports 28.

In the foregoing description there is disclosed valve structure designed to prevent chattering and squealing in the valve and also to assure smooth flowing of fluid through the valve. These advantages are derived by the provision in combination of the properly designed valve seating surface, the proper guiding of the ball valve element and the proper cushioning of the movement of the ball.

It is of course to be understood that the details of structure and the arrangement of parts may be variously changed and modified without departing from the spirit and scope of the invention.

We claim:

1. A relief valve comprising an elongated casing having a cylindrical bore therein, an inlet port entering the bore from an end thereof and an outlet port leading laterally out of said bore in spaced relation to said inlet port, a cylindriform bushing removably mounted in the bore having an open end directed toward the inlet port and porting communicating laterally with the outlet port, a ring seat aligned with the inlet port and held in the bore by the bushing and including a centering boss extension centered in the open end of the bushing, a ball cooperating with said seat in said bushing for controlling fluid pressure flow through the inlet port to the outlet port, said seat having a ball engaging seat surface flared at an angle of approximately 60° with respect to a base drawn perpendicular to the flow passage through the ring and of such major and minor diameters relative to the size of the ball that said ball will engage the flared surface at a point from two-thirds to three-fourths of the distance from the minor diameter toward the major diameter, a deep cup having a free sliding fit in the bushing and engaging said ball, and cushion spring means yieldably holding the cup against said ball and the ball against said flared surface for cushioning opening movements of the ball, the clearance in the sliding fit of the cup in the bushing being .003 to .005 for opening pressures ranging from 1100 to 1850 pounds per square inch and from .005 to .007 for opening pressures up to 1100 pounds per square inch.

2. A relief valve comprising an elongated casing having a cylindrical bore therein, an inlet port entering the bore from an end thereof and an outlet port leading laterally out of said bore in spaced relation to said inlet port, a cylindriform bushing removably mounted in the bore closed at one end and having an open end directed toward the inlet port and terminating short of the outlet port, a guide sleeve axially aligned with the bushing and having a centering boss extending thereinto and a flange centering the sleeve in said bore, a ring seat aligned with the inlet port and held in the bore by the sleeve and bushing and including a centering boss extension centered in said sleeve, a ball cooperating with said seat in said bushing for controlling fluid pressure flow through the inlet port to the outlet port, said sleeve having porting therein communicating with the outlet port and guide means for accurately guiding movement of the ball along the common axis of said seat ring said sleeve and said bushing, said seat having a ball engaging seat surface flared at an angle of approximately 60° with respect to a base drawn perpendicular to the flow passage through the ring and of such major and minor diameters relative to the size of the ball that said ball will engage the flared surface at a point from two-thirds to three-fourths of the distance from the minor diameter toward the major diameter, a deep cup having a free sliding valve action cushioning fit in the bushing and having its closed end engaging said ball, and cushion spring means yieldably holding the cup against said ball and the ball against said flared surface and supplementing the action of said cup in cushioning opening movements of the ball.

3. A relief valve comprising an elongated casing having a cylindrical bore therein, an inlet port entering the bore from an end thereof and an outlet port leading laterally out of said bore in spaced relation to said inlet port, a cylindriform bushing removably mounted in the bore having an open end directed toward the inlet port and porting communicating laterally with the outlet port, a ring seat aligned with the inlet port and held in the bore by the bushing and including a centering boss extension centered in the open end of the bushing, a ball cooperating with said seat in said bushing for controlling fluid pressure flow through the inlet port to the outlet port, said seat having a ball engaging seat surface flared at an angle of approximately 60° with respect to a base drawn perpendicular to the flow passage through the ring and of such major and minor diameters relative to the size of the ball that said ball will engage the flared surface at a point from two-thirds to three-fourths of the distance from the minor diameter toward the major diameter, a deep cup having a free sliding fit in the bushing and engaging said ball, and cushion spring means yieldably holding the cup against said ball and the ball against said flared surface for cushioning opening movements of the ball, the clearance in the sliding fit of the cup in the bushing being greater for opening pressures ranging below 1100 pounds per square inch than for operating pressures ranging above 1100 and up to 1850 pounds per square inch.

4. A relief valve comprising an elongated casing having a cylindrical bore therein, an inlet port entering the bore from an end thereof and an outlet port leading laterally out of said bore in spaced relation to said inlet port, a cylindriform bushing removably mounted in the bore closed at one end and having an open end directed toward the inlet port and terminating short of the outlet port, a guide sleeve axially aligned with the bushing and having a centering boss extending thereinto and a flange centering the sleeve in said bore, a ring having a flared seat aligned with the inlet port and held in the bore by the sleeve and bushing and including a centering boss extension centered in said sleeve, a ball cooperating with said seat in said bushing for controlling fluid pressure flow through the inlet port to the outlet port, said sleeve having porting therein communicating with the outlet port and guide means for accurately guiding movement of the ball along the common axis of said seat ring, said sleeve and said bushing, a deep cup having a free sliding valve action cushioning fit in the bushing and having its closed end engaging said ball, and cushion spring means yieldably holding the cup against said ball and the ball against said flared surface and supplementing the action of said cup in cushioning opening movements of the ball.

ARTHUR L. PARKER.
DOMENIC A. DI TIRRO.

REFERENCES CITED

The following references are of record in the file of this patent:

UNITED STATES PATENTS

| Number | Name | Date |
|---|---|---|
| 2,312,877 | Campbell | Mar. 2, 1943 |
| 1,642,724 | Fleming | Sept. 20, 1927 |
| 1,672,394 | Sargent | June 5, 1928 |
| 1,931,918 | Bard | Oct. 24, 1933 |
| 790,056 | Hilger | May 16, 1905 |
| 2,294,568 | Neilsen | Sept. 1, 1942 |
| 751,333 | Obolensku | Feb. 2, 1904 |
| 1,769,240 | Smith | July 1, 1930 |
| 2,297,076 | Sacks | Sept. 29, 1942 |
| 1,120,545 | Ruwell | Dec. 8, 1914 |
| 2,351,873 | Parker | June 20, 1944 |
| 2,342,659 | Grove | Feb. 29, 1944 |

FOREIGN PATENTS

| Number | Country | Date |
|---|---|---|
| 344,686 | British | Mar. 12, 1931 |
| 315 | British | 1858 |
| 453,489 | British | Sept. 9, 1936 |